Nov. 20, 1962 M. MARON 3,065,426

DUAL ELECTRONIC SWITCH SYMMETRICALLY LOCATED IN DELAY LINE

Filed Oct. 24, 1960 2 Sheets-Sheet 1

INVENTOR
MEYER MARON
BY Darby & Darby
ATTORNEYS

Nov. 20, 1962 M. MARON 3,065,426

DUAL ELECTRONIC SWITCH SYMMETRICALLY LOCATED IN DELAY LINE

Filed Oct. 24, 1960 2 Sheets-Sheet 2

INVENTOR
MEYER MARON
BY Darby & Darby
ATTORNEYS

United States Patent Office 3,065,426
Patented Nov. 20, 1962

3,065,426

DUAL ELECTRONIC SWITCH SYMMETRICALLY LOCATED IN DELAY LINE

Meyer Maron, East Paterson, N.J., assignor to Fairchild Camera and Instrument Corporation, Syosset, N.Y., a corporation of Delaware Filed Oct. 24, 1960, Ser. No. 64,370
1 Claim. (Cl. 328—56)

The present invention relates to a symmetrical filter arrangement to transmit pairs of complex electrical waves, requiring a wide band of frequencies for their transmission, with equal delay. More particularly the invention relates to the use of such symmetrical filters with electronic switches requiring pairs of high frequency switching amplifiers to switch pairs of signals into symmetrical inputs of paraphase or push-pull amplifiers.

One use of my invention is described in a copending application by Bernard L. Hegeman entitled Direct Read-Out System for Oscilloscopes, but my invention is not claimed therein, nor is it limited to use in oscilloscopes as there described. As stated hereinabove the invention may be used in any symmetrical electrical circuit where pairs of signals are mixed or switched alternately on a time sharing basis and where a wide band of frequencies is required to reproduce the signals accurately.

It is an object of my invention to provide a symmetrical filter arrangement for transmitting pairs of complex electrical waves from two sources to a single output with equal delay.

It is another object of my invention to provide such a filter arrangement utilized with an electronic switch consisting of two pairs of switching tubes connected at symmetrical input points in the filter arrangement or delay line.

It is still another object of this invention to provide a wide band dual electronic switch with two pairs of input terminals and one pair of output terminals in which the inherent circuit components are kept separate from one another and are separately compensated, the time delay between one input and the output being substantially identical to that between the other input and the output.

It is a further object of this invention to provide a wide band, dual channel, symmetrical electronic switch in which the channel time delays are equalized to a fraction of a microsecond.

Figure 1:
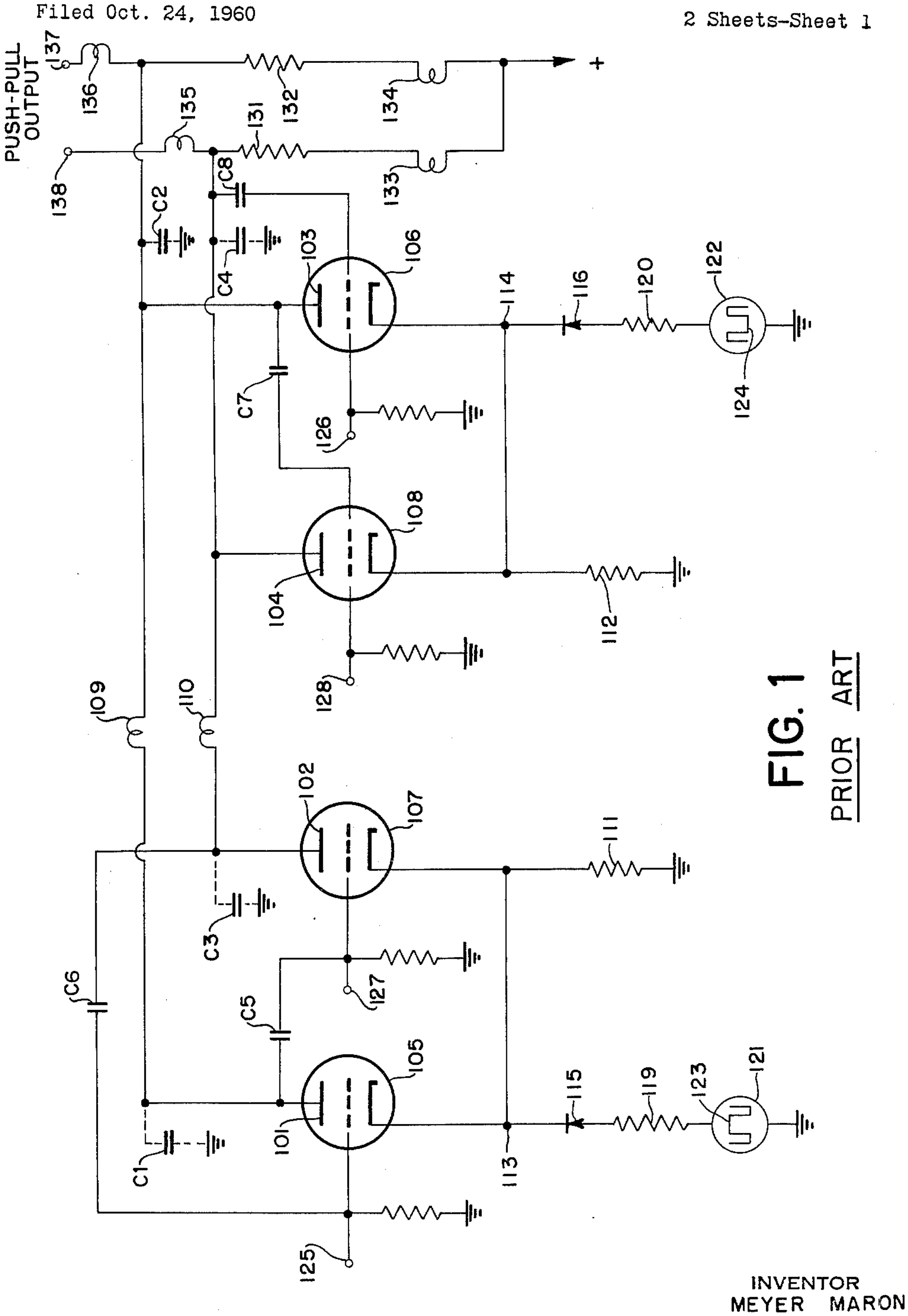
FIG. 1 PRIOR ART
Figure 2:
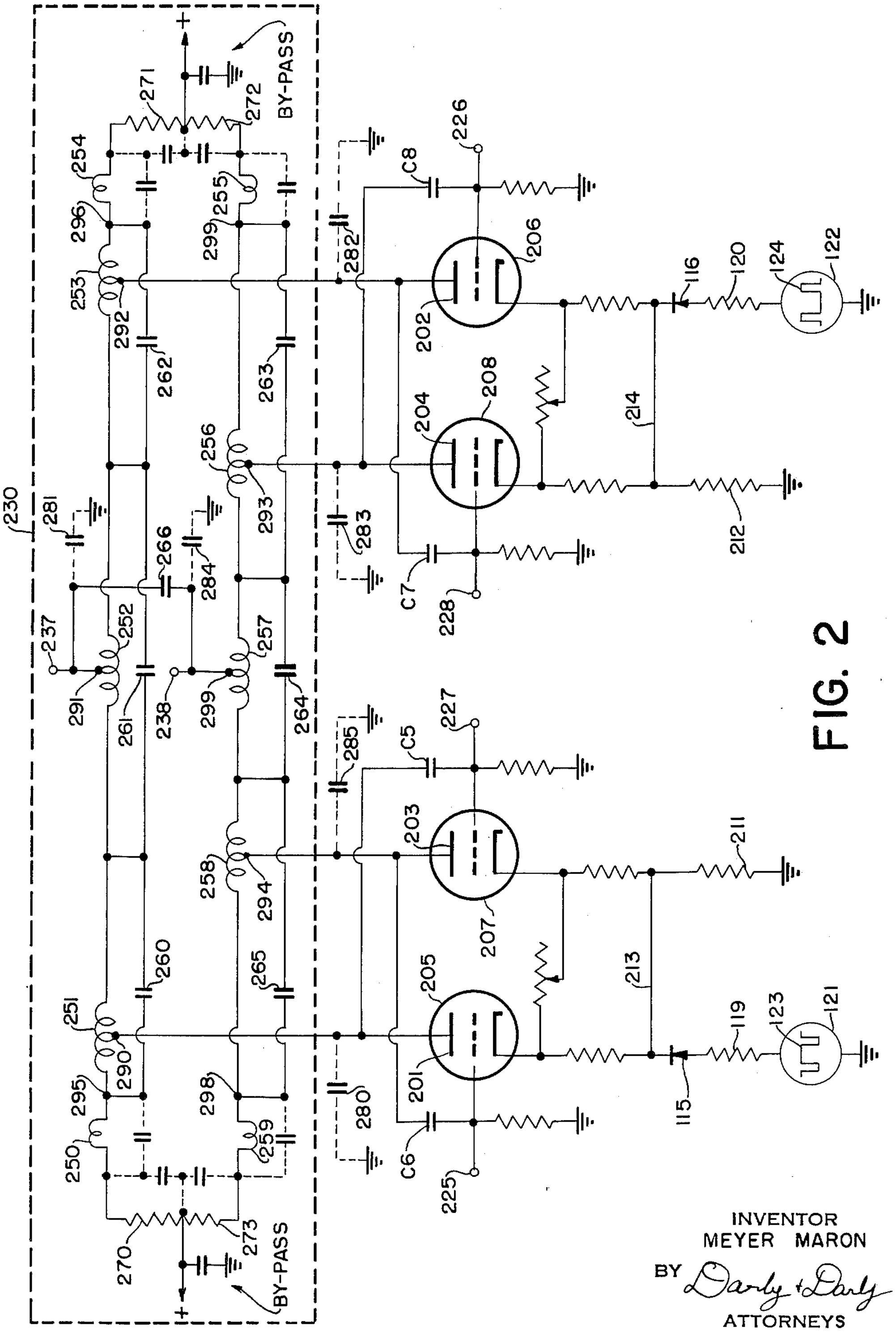

Other objects and features of the invention will become apparent to those skilled in the art when the following specification is considered in connection with the annexed drawings in which, FIGURE 1 is a prior art circuit for a dual electronic switch; and FIGURE 2 is a schematic circuit diagram of a preferred embodiment of my invention.

Referring now to FIGURE 1, in prior art it has been usual to switch two different balanced push-pull signals supplied to two pairs of input terminals 125, 127 and 126, 128 so that these signals appear alternately at a balanced pair of output terminals 137, 138 in well known time sharing sequence. Switching may be accomplished by pairs of synchronized rectangular waves 123, 124 from generators 121, 122 applied to diodes 115, 116, respectively. Positive going portions of 123, 124 cause common cathode points 113, 114 to go positive alternately and thus to cut off the pairs of switch tubes 105, 107 and 106, 108 alternately, so that their amplified output waves appear alternately at the output terminals 137, 138 in a well known manner.

The output capacitances $C_1$, $C_2$ and $C_3$, $C_4$, however, and the load resistors 132, 131 determine the rise time at terminals 137, 138 and thus make the speeds of voltage change on the output terminals slower than the speeds on the input terminals. As is well known, the addition of low pass filter structure elements such as inductances 109, 110 will segregate capacitors $C_1$ from $C_2$ and $C_3$ from $C_4$ and will improve the rise time of each of the output circuits. Furthermore, the introduction of additional circuit elements such as inductances 133, 135 at anode 104 and such as inductances 134, 136 at anode 103 can be used to improve still more the rise time in the output circuits.

In any low pass filter structure the electric waves transmitted therethrough to the output terminals are subject to a time delay in seconds which is equal to the square root of the product of the total inductance in henries and capacitance in farads of which the structure is composed; and this is well known. In the prior art arrangement, however, signals applied to input terminal 125 are subject to a greater time delay at output terminal 137 than are those applied to input terminal 126. The extra delay is caused by the finite magnitude of inductance 109, capacitance $C_1$, and the cross neutralizing capacitance $C_5$ (if the tubes 105 and 107 are triodes, as shown, and require cross neutralization to prevent oscillations due to the internal plate grid capacitance).

Although the extra time delay introduced by the inductance component 109 and the unwanted components $C_1$, $C_5$ may be small in magnitude, it still is undesirable and prevents the signals applied to inputs 125, 126 from being observed in true time relationship at the time shared output terminal 137.

My invention, shown as a preferred embodiment in FIGURE 2, avoids this undesirable time unbalance and dissymmetry of time delay between two time shared pairs of signals applied to different pairs of input terminals and transmitted to a common pair of output terminals.

Referring now to FIGURE 2 a symmetrical time sharing switch structure is shown. Two pairs of input signals to be compared are applied to pairs of grid connectors 225, 227 and 226, 228 and appear in time shared sequence at output terminals 237, 238 by coaction of switch waves 123, 124 as explained for FIGURE 1.

The pairs of anodes 201, 202 and 203, 204 of pairs of tubes 205, 206 and 207, 208 respectively, are connected symmetrically into a dual symmetrical delay line structure 230, at input terminals 290, 292 and 294, 293, each terminal and ground comprising an input terminal pair. This structure comprises two separate *m*-derived bridged-T networks of three sections. The first network is composed of series arm inductive elements 251 and 253 and capacitive elements 260 to 262, and shunt arm capacitive elements 280, 281, 282; and with *m*-derived mid-series terminating sections composed of inductance 250, resistance 270 and inductance 254, resistance 271 connected at terminal points 295, 296 respectively. The second network consists of series arm inductive elements 256 to 258 and capacitive elements 263 to 265, and shunt arm elements 285, 284, 283, and with terminations 255, 272 and 259, 273 at terminal points 297, 298 respectively.

As is well known in the electronic art the driving points of filter structures, that is, the input and output terminals for connection to generators, amplifiers or utilization networks which have distributed or inherent shunt capacitances (grids or anodes of vacuum tubes) is preferably at mid-shunt section points such as 290, 291 or 292 of the first network. Pure resistance terminations at the two ends of a network may be either mid-series or mid-shunt.

It has been usual in the past to consider one end of a filter network as the input terminal pair and the other end as the output terminal pair, in which case a time delay always exists between input and output in a 4-terminal network.

The mid-shunt terminal pair, for example, consisting of mid-shunt point 290 and ground, could be used as a driving point pair to which to connect the driving anode impedance associated with anode 201; and points 291 and ground could be similarly used for a second driving point pair of terminals. Likewise, other points and ground on one side of 290, such as 292, 296 could be used as an output terminal pair. The time delays, due to T sections such as composed by inductor 253 and capacitor 282 between the two inputs and the output are unequal, however, because the number of such sections is unequal.

I have discovered that when an odd number of input or output terminal pairs is included in a transmission network in which the total number of terminal pairs is odd, then the pairs of output or input terminals, as the case may be, must be symmetrically located with respect to a single pair of input or output terminals respectively, which single pair must be at the center of the network to achieve equal time delay, and that the two ends of the network must have equal terminations.

Thus, in FIGURE 2 a symmetrical structure is shown in which two pairs of input terminals 290, 294 and 292, 293 and one pair of output terminals 237, 238 are required, on two networks, each with two end terminations, respectively 270, 271 and 272, 273. Each network must be composed of an even number of half-section filters (T or pie or bridged-T or lattice or other equivalent sections), and the mid-point of the networks and ground is chosen as the output terminal pair, in this example.

The terminations are symmetrically located at the two ends of the network, and the input terminal pairs 290, 294 and 292, 293 respectively are placed at symmetrically located mid-shunt points in the network with respect to the terminations, one on either side of the network midpoints 237, 238, an even number of half-sections from the midpoints.

The purpose of the low pass filter structure associated with triode anodes 201, 202 is to minimize the rise time at output terminal 237 which is symmetrically located with respect to these anodes. The center tapper inductors 251, 252, 253 are identical to one another and capacitors 260, 261, 262 are identical also, in the preferred embodiment, although it is only necessary that the symmetrically placed elements be identical.

Since the mid-shunt characteristic and image impedances of filter sections and networks (see Guillemin "Communication Networks," vol. II, pp. 173, 279, 325) are quite sensitive to the shunt admittances, for example to the values of capacitors 280, 281, 282 at points 290, 291, 292 respectively, the capacitances at these points may need to be equalized. When output terminals 237, 238 are used to supply signals to the input grids of a push-pull or paraphase amplifier, the input capacitances 281, 284 due to the connections to grids may be less than the output capacitances of 280, 282 of anodes 201, 202 and their associated circuits. In such case image impedance balancing can be achieved by adding a small capacitor 266 between terminals 237, 238 having twice the value of the capacitance difference between 280—281 or 282—284. In the reverse case, capacitances must be added at the input terminals to equalize the input and output.

When comparing electrical waveforms containing 50 mc. components, millimicrosecond time delays become important. The upper cutoff frequency for signals transmitted from anode 201 to terminal 237 is the same as that for signals from anode 202 to terminal 237; and this may be, in one example, of the order of 50 mc. A finite cutoff frequency always imposes a finite time delay reciprocally related thereto, due to the finite inductance and capacitance of the filter as mentioned heretofore. Output terminal 237 includes identical inductances and capacitances in the filter structure included between anode 201 and terminal 237, and those included between anode 202 and 237.

The time delay between each anode and the output terminal may be in this example of the order of 7 millimicroseconds. It will be clear from the foregoing that my invention provides for time delays which are equalized to a fraction of a millimicrosecond.

Although the method of constructing symmetrical arrangements of filter sections between two inputs and one output or one output and two inputs to equalize the time delay therebetween has been described for bridged-T, *m*-derived, lowpass sections, it will be understood that it is not limited thereto and that other types of filter sections well known to those skilled in the art may be used.

What is claimed is:

In a dual symmetrical delay line composed of two separate filter networks each comprising four bridged-T *m*-derived half section bandpass filters having equal time delays and equal characteristic impedances; in combination, four terminating impedances matched to the characteristic impedance at each end of each network; means comprising an output terminal at the center of each delay line, said output terminals having impedance balance to ground; means comprising a first pair of input terminals, one located on each of said delay lines, said located input terminals being located symmetrically at the centers of the first full bridged-T sections on the same side of the said output terminals thereon; and a second pair of input terminals, one on each of said delay lines, said second pair being symmetrically located on the other side of said output terminals thereon; means comprising two pairs of electronic switches actuated by rectangular switching waves, each of said pairs having a pair of input electrodes and a pair of output electrodes; means to connect one of said pairs of output electrodes to said first pair of input terminals and the other of said pairs of output electrodes to said second pair of input terminals; means to connect said pair of output terminals to a balanced utilization load; means to balance the pair of impedances at said pair of output terminals to match the average of the pairs of impedances at the said pair of input terminals; and means to apply pairs of signals to be compared to each of said pairs of input electrodes.

References Cited in the file of this patent

UNITED STATES PATENTS

| | | |
|---|---|---|
| 2,000,924 | Colton et al. | May 14, 1935 |
| 2,373,458 | Clark | Apr. 10, 1945 |
| 2,774,069 | Parker | Dec. 11, 1956 |

FOREIGN PATENTS

| | | |
|---|---|---|
| 112,749 | Australia | Mar. 18, 1941 |